United States Patent [19]

Moriguchi et al.

[11] 4,449,367

[45] May 22, 1984

[54] KNOCKING CONTROL DEVICE FOR TURBOCHARGED INTERNAL COMBUSTION ENGINE

[75] Inventors: Koichi Moriguchi, Nagoya; Kenzi Iwamoto, Nishio; Ryuichi Matushiro, Okazaki; Hisasi Kawai, Toyohashi; Nobutaka Mizuno; Yasuhiro Ikuta, both of Okazaki, all of Japan

[73] Assignees: Nippon Soken, Inc., Nishio; Toyota Jidosha Kabushiki Kaisha, Toyota, both of Japan

[21] Appl. No.: 398,272

[22] Filed: Jul. 14, 1982

[30] Foreign Application Priority Data

Jul. 18, 1981 [JP] Japan ................. 56-111546

[51] Int. Cl.³ .......................... F02B 37/00
[52] U.S. Cl. ............................ 60/602
[58] Field of Search ............ 60/602, 603, 600, 601

[56] References Cited

U.S. PATENT DOCUMENTS

| | | | |
|---|---|---|---|
| 4,322,948 | 4/1982 | Emmenthal | 60/602 |
| 4,372,119 | 2/1983 | Gillbrand | 60/600 |
| 4,387,571 | 6/1983 | Katsumata | 60/602 |

FOREIGN PATENT DOCUMENTS

WO81/01171 4/1981 PCT Int'l Appl. .............. 60/602

OTHER PUBLICATIONS

Gillbrand, Per, "Knock Detector System Controlling Turbocharger Boost Pressure", SAE Paper No. 800833, 6/80.

Primary Examiner—Douglas Hart
Attorney, Agent, or Firm—Cushman, Darby & Cushman

[57] ABSTRACT

In a knocking control device comprising an exhaust bypass valve driven by the diaphragm actuator and a knocking control circuit, the amount of bypassed exhaust gas is adjusted in accordance with the knocking, the upper and lower limits regarding the opening degree of the control valve are determined in accordance with the opening degree of the throttle valve and the signal determining the upper limit concerning the opening degree of the control valve is prior to the signal determining the opening degree of the control valve due to the knocking signal when the opening degree of the throttle valve is changed. Thus, an increase in the output of the engine and an improvement in specific fuel consumption is achieved and the durability of the engine is improved due to the elimination of knocking and a decrease in the temperature of the exhaust gas.

3 Claims, 7 Drawing Figures

KNOCKING CONTROL DEVICE FOR TURBOCHARGED INTERNAL COMBUSTION ENGINE

BACKGROUND OF THE INVENTION

1. Field of the Invention

The present invention relates to a knocking control device for a turbocharged internal combustion engine.

2. Description of the Prior Art

Usually, in a turbocharged internal combustion engine, the objects being to increase the engine output and specific fuel consumption, an increase of the intake air pressure due to the turbocharger results in an increase in the temperature of the intake air. In order to increase the charging pressure at a low engine speed and to enlarge the turbocharging effect, the sectional area of the nozzle from which the exhaust gas flows into the turbine must be as small as possible. As a result, the exhaust gas pressure increases at a high engine speed and knocking easily occurs. Particularly, continuous, heavy knocking results in a decrease in the engine output and in the durability of the engine. Ultimately, it results in the destruction of the engine. Therefore, although by decreasing the compression ratio of the engine knocking is less frequent, increasing the engine output and specific fuel consumption in an engine with a turbocharger is to no avail.

In the prior art, knocking is detected and the ignition timing is delayed in accordance with the knocking. As a result, the decrease in the engine output and in specific fuel consumption is minimized. However, in this delay control of the ignition timing, since knocking is avoided, the temperature of the exhaust gas becomes extremely high, the parts of the exhaust system are exposed to a high-temperature atmosphere, the durability of the parts is decreased, the temperature of the residual gas in the cylinders of the engine rises, and knocking easily occurs. The aim of the present invention is to solve the above-mentioned problems.

SUMMARY OF THE INVENTION

The object of the present invention is to provide a knocking control device wherein by detecting knocking and appropriately decreasing the charging pressure corresponding to the knocking feature, knocking is avoided and the temperature of the exhaust gas is decreased so that the output of the engine is increased, the specific fuel consumption is improved, and the durability of the engine is enhanced.

DESCRIPTION OF THE PREFERRED EMBODIMENTS

Figure 1:
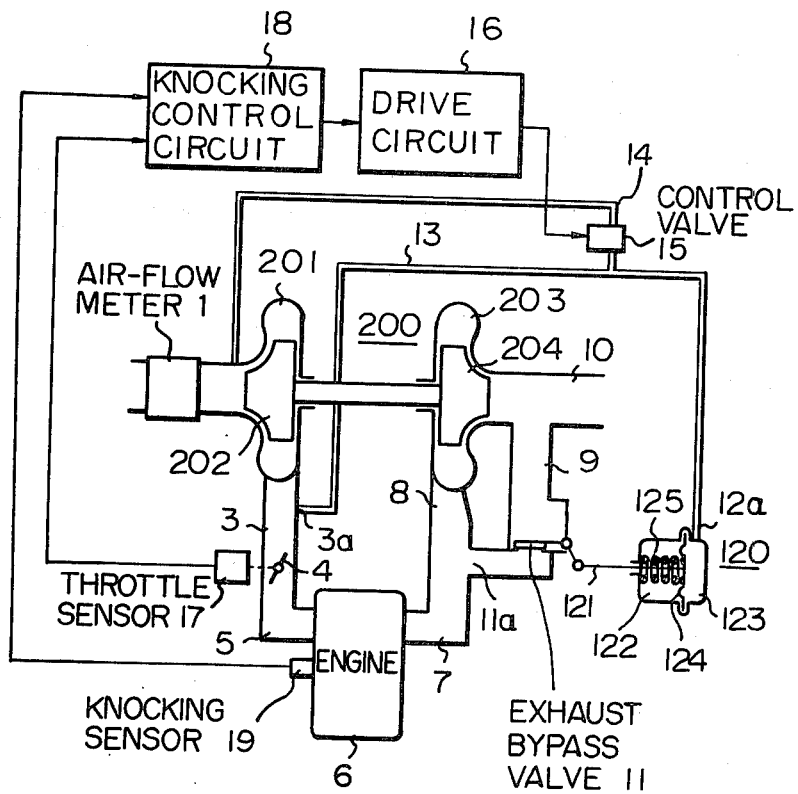
FIG. 1 is a schematic diagram illustrating the constitution of a knocking control device according to an embodiment of the present invention.

In FIG. 1, the intake air for engine 6 is compressed and supercharged to engine 6 through air-flow meter 1, turbocharger 200 which comprises compressor housing 201, compressor wheel 202, turbine wheel 204 attached to a shaft coaxially with compressor wheel 202, turbine housing 203, and intake pipe 3. At a portion of intake pipe 3, there is provided pressure sensing port 3a through which air pressure from the compressor is released. Throttle valve 4 is located downstream of intake pipe 3, and turbocharged air is supplied to engine 6 through intake manifold 5. Exhaust gas from engine 6 flows into turbine housing 203 in turbocharger 200 through exhaust manifold 7 and exhaust pipe 8, and the exhaust gas drives turbine wheel 204 and is exhausted through exhaust pipe 10. Exhaust bypass pipe 9 is branched out from exhaust pipe 8. Exhaust bypass pipe 9 bypasses turbocharger 200 and is joined to exhaust pipe 10. Exhaust bypass valve 11 is provided in exhaust bypass pipe 9. Exhaust bypass valve 11 can change the sectional area of exhaust bypass pipe 9 and is linked to actuator 120 by link 121. Actuator 120 has two diaphragm chambers 122 and 123. Diaphragm 124, which separates diaphragm chamber 123 from chamber 124, is linked to exhaust bypass valve 11 by link 121. Diaphragm chamber 122 leads to the open air and has spring 125 which pushes diaphragm 124 so as to close exhaust bypass valve 11 normally through link 121. Diaphragm chamber 123 is connected to pressure sensing port 3a through pressure pipe 13. Pressure pipe 13, which conducts compressed air, is connected to diaphragm chamber 123 at pressure intake port 12a and is branched midway thereof, and branched pipe 14 leads to the open air or to the intake port of compressor housing 201 through control valve 15. Control valve 15 is of the linear solenoid type. The opening degree of control valve 15 changes continuously due to drive circuit 16 which is controlled by knocking control circuit 18, and control valve 15 changes the pressure value which is supplied to diaphragm chamber 123. The output of sensor 17 which detects the opening degree of throttle valve 4 is supplied to the input of knocking control circuit 18, which controls the upper limit value and lower limit value regarding the opening degree of valve 15.

Figure 2:
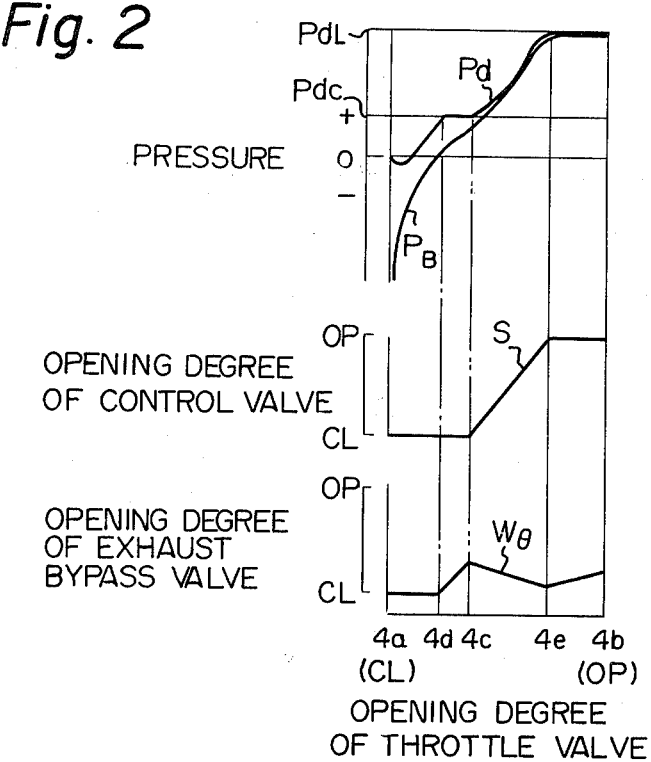
FIGS. 2 and 3 are graphs explaining the operation of the device in FIG. 1.
Figure 3:
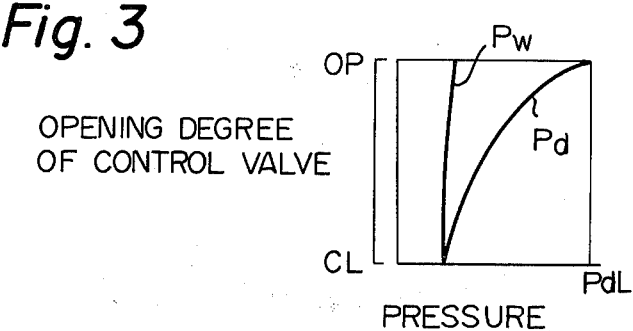
Figure 4:
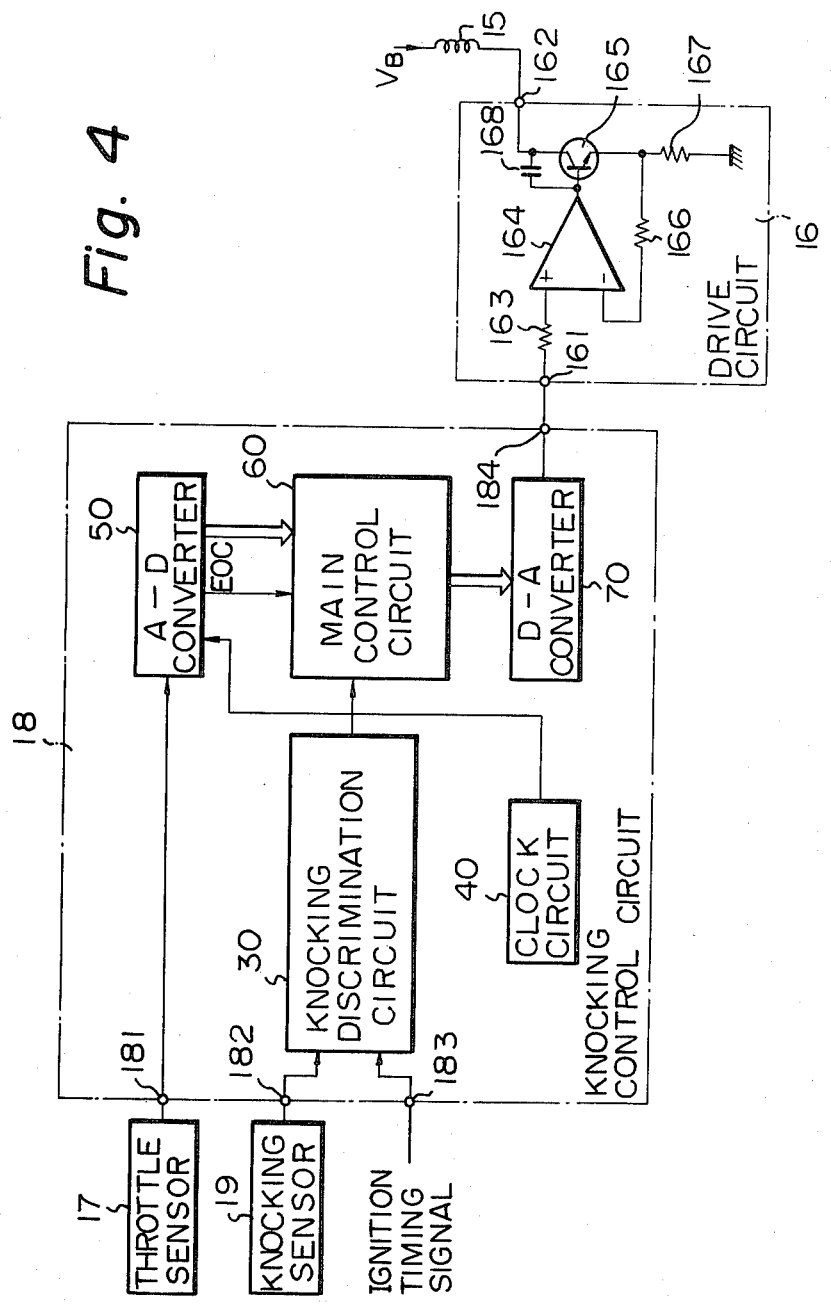
FIG. 4 is a block circuit diagram of a knocking control circuit and a drive circuit in the device of FIG. 1.

The operation of the above-mentioned device will be explained below. In FIG. 2, the relationships between the opening degree of throttle valve 4 and pressure $P_d$ in intake pipe 3, pressure $P_B$ in intake manifold 5, opening degree S of control valve 15, and opening degree $W\theta$ of exhaust bypass valve 11 are shown. In FIG. 3, the relationships between opening degree S of control valve 15 and pressure $P_d$ and pressure $P_W$ in diaphragm chamber 123 are shown. In the figure, OP and CL are abbreviations of OPEN and CLOSED, respectively.

In the case of a vehicle, after the engine starts, the engine output is adjusted by adjusting the opening degree of throttle valve 4. As shown in FIG. 2, the opening degree of throttle valve 4 changes continuously from no load position 4a to full load position 4b so that the output of the engine is adjusted. The opening degree of throttle valve 4 is detected by throttle sensor 17. The signal from sensor 17 is supplied to knocking control circuit 18. On the other hand, when throttle valve 4 opens from degree 4a to 4c, according to the increase in the amount of intake air, the exhaust energy which drives turbocharger 200 is increased, and pressure $P_d$ at the compressor exit becomes pressure $P_{dc}$ when throttle valve 4 opens to degree 4d. Pressure $P_d$ at the compressor exit is conducted into diaphragm chamber 123 in actuator 120 of exhaust bypass valve 11 from port 3a through pressure pipe 13. At this time, as mentioned above, since control valve 15 is in a completely closed state, pressure pipe 13 is shut off from the open air or the compressor intake port. Thus, pressure $P_d$ at the compressor exit is equal to pressure $P_W$ in diaphragm chamber 123. If the predetermined energized load value of spring 125 is pressure $P_{dc}$, when pressure $P_d$ of the compressor exit becomes higher than pressure $P_{dc}$, the pressure pushes down diaphragm 124 and moves exhaust bypass valve 11 so that it opens through link 121.

As a result, part of the exhaust gas from engine 6 flows into exhaust bypass pipe 9, and the amount of exhaust gas which is conducted from exhaust pipe 8 to turbine chamber of turbocharger 200 and which operates turbine wheel 204 is decreased. Namely, the output of compressor wheel 202 arranged coaxially with turbine wheel 204 is decreased, pressure $P_d$ at the compressor exit falls, and pressure $P_d$ does not rise higher than pressure $P_{dc}$ because of the feedback pass. At opening degree 4c of throttle valve 4, the gas resistance of throttle valve 4 decreases to almost zero and pressure $P_d$ in intake pipe 3 becomes approximately equal to pressure $P_B$ in intake manifold 5. When a greater engine power is required, the engine power is increased in accordance with the increase of pressure $P_B$ in intake manifold 5 as described below. Namely, throttle valve 4 opens from degree 4d to 4c. Then sensor 17 detects the change in the opening degree of throttle valve 4, the detected output is supplied to the input of knocking control circuit 18, and knocking control circuit 18 supplies the upper limit value signal regarding the opening degree of control valve 15 to drive circuit 16. Here, the upper limit value signal corresponds to the opening degree of throttle valve 4. Thus, the pressure of the compressor exit transmitted through pressure pipe 13 is conducted to the open air or to the intake port of compressor housing 201 (the intake port, the pressure is approximately equal to the atmospheric pressure) through pipe 14 and control valve 15. As a result, the pressure difference between pressure $P_d$ in intake pipe 3 at the compressor exit and pressure $P_W$ conducted to diaphragm chamber 123 increases. The relationship between opening degree S of control valve 15 and pressures $P_d$ and $P_W$ is shown in FIG. 3.

As shown in FIG. 2, when throttle valve 4 opens from degree 4c to 4b, opening degree S of control valve 15 gradually increases towards the fully open position, and, therefore, opening degree $W\theta$ of exhaust bypass valve 11 gradually decreases towards closed position until the opening degree of throttle valve 4 becomes degree 4e, at which degree pressure $P_d$ in the compressor exit becomes pressure $P_{dL}$. As a result, the amount of bypassed gas conducted to turbine housing 203 from exhaust manifold 7 through exhaust pipe 8 and which flows through exhaust gas intake port 11a gradually decreases. Namely, the amount of exhaust gas conducted to turbine housing 203 gradually increases in accordance with the opening process of throttle valve 4, the work of turbocharger 200 increases, and pressure $P_d$ at the compressor exit rises. When throttle valve 4 is open to beyond degree 4c, as mentioned above, the resistance due to throttle valve 4 becomes extremely low. Therefore, pressure $P_d$ at the compressor exit is almost equal to pressure $P_B$ in intake manifold 5 with hardly a pressure difference therebetween, and the output of engine 6 increases.

In the above-mentioned constitution, when control valve 15 is completely open, the relationship existing between pressure $P_d$ at the compressor exit and pressure $P_W$ in diaphragm chamber 123 defines the maximum value $P_{dL}$ of pressure $P_d$ at the compressor exit by locating a valve in pressure pipe 13 or by selecting the maximum opening degree of control valve 15. For example, if throttle valve 4 opens from degree 4e to 4b, since control valve 15 is completely open at 4e, when pressure $P_d$ at the compressor exit tends to become higher than pressure $P_{dL}$, pressure $P_W$ in diaphragm chamber 123 rises, a feedback path is formed as mentioned above, exhaust bypass valve 11 opens, and pressure $P_{dL}$ is controlled at a certain constant value.

As explained above, if knocking occurs during the operation of the engine, the charging pressure of which is controlled at a certain value, the charging pressure is caused to fall to the pressure corresponding to the knocking by adjusting the opening degree of exhaust bypass valve 11. Adjusting is performed by a method in which the opening degree of control valve 15 is changed once, by a certain amount, to a lower value from the upper limit of the opening degree of control valve 15 being defined by the output of sensor 17 corresponding to the knocking detected through known knocking sensor 19 and knocking control circuit 18, or a method in which the opening degree of control valve 15 is changed once, by a certain amount, to a higher value towards the upper limit of the opening degree of control valve 15.

Knocking control circuit 18 will be explained below with reference to FIGS. 4 through 7. Input terminal 181 of knocking control circuit 18 is connected to the throttle sensor 17, input terminal 182 is connected to the knocking sensor 19, and input terminal 183 is connected to a terminal supplying the ignition timing signal in the distributor (not shown). Output terminal 184 is connected to the input terminal of drive circuit 16, and input terminal 181 is connected to the data input terminal of analog-digital (A-D) converter 50. Input terminals 182 and 183 are connected to the first and second input terminals of knocking discrimination circuit 30, respectively.

Knocking discrimination circuit 30 determines the occurrence of knocking on the basis of the signal from knocking sensor 19 and the ignition timing signal. If knocking occurs, knocking discrimination circuit 30 outputs a high-level signal, and if knocking does not occur, knocking discrimination circuit 30 outputs a low-level signal. The above-mentioned knocking discrimination circuit is described in FIG. 2 of GB Laid-Open No. 2054739 published Feb. 18, 1981. In GB Laid-Open No. 2054739, the output of the comparator corresponds to the output of knocking discrimination circuit 30 according to the present embodiment. The output of knocking discrimination circuit 30 is connected to a bus line through an interface circuit in main control circuit 60.

Clock circuit 40 comprises an oscillator, a counter, and logic circuits and generates a 10-millisecond pulse in the output thereof. The output of clock circuit 40 is connected to a start convert terminal of A-D converter 50.

As A-D converter 50, an 8 bit A-D converter (No. MN 5120 made by Micro Network Corporation) is used. When the output signal of clock circuit 40 is applied to the start convert terminal of A-D converter 50, A-D converter 50 starts conversion and generates a pulse in the EOC terminal thereof at the end of conversion. The conversion time is approximately 10 microseconds. The EOC output of A-D converter 50 is supplied to the interruption terminal of main control circuit 60, and the 8 bit binary code output of A-D converter 50 is supplied to the I/0 terminal of main control circuit 60 through the interface circuit.

Figure 5:
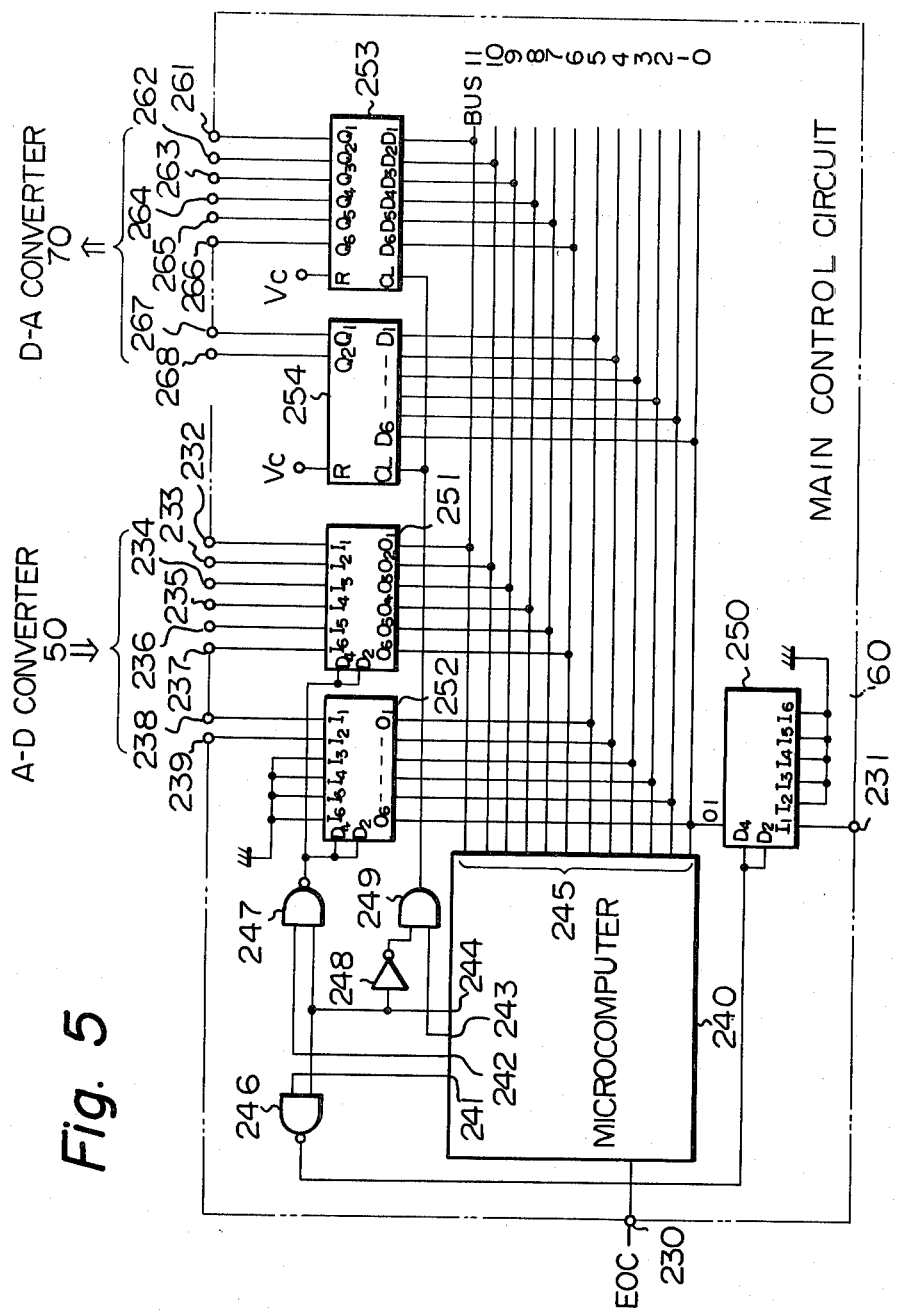
FIG. 5 is a circuit diagram of a main control circuit in the knocking control circuit of FIG. 4.

Main control circuit 60 will be explained below. FIG. 5 shows a circuit diagram of main control circuit 60. Input terminal 230 is connected to the EOC terminal of A-D converter 50. The output of knocking discrimination circuit 30 is supplied to input terminal 231. Input terminals 232~239 receive, respectively, an 8 bit binary code output which increases in accordance with an increase in the terminal number. As microcomputer 240, No. TLCS-12A made by TOSHIBA CORP. is used. The circuit and the operation of microcomputer 240 are well known. Therefore, a detailed description thereof is not given. Microcomputer 240 is operated by an internal clock having a frequency of 2 MHz and operation of microcomputer 240 is initiated as soon as the power source is supplied. Operation begins from an instructed address of a read only memory (ROM). One of the eight interruption signal lines of said microcomputer 240 is connected to input terminal 230. Terminals 241, 242, and 243 are connected to three device address selection terminals SE0, SE1, and SE2, respectively, which three device address selection terminals are included in sixteen device address selection lines of device control unit (DCU) in microcomputer 240. These lines connect the device with the bus. Terminal 241 is connected to one input terminal of NAND gate 246, terminal 242 is connected to an input terminal of NAND gate 247, and terminal 243 is connected to an input terminal of AND gate 249. The line from terminal 244 is an input/output command line of the DCU. When the line from terminal 244 is logically "1", data are transmitted from the device to a processor (CPU) in microcomputer 240, and when the line is logically "0", data are transmitted from the CPU to the device. Terminal 244 is connected to the other input terminals of NAND gate 246 and NAND gate 247 and terminal 244 is connected to the other input terminals of AND gate 249 through inverter 248. Bus 245 is a 12 bit bus line. Bus line BUS 11 is the least significant digit and bus line BUS 0 is the most significant digit. Buffer circuit 250 consists of six noninverted buffer circuits having three states, and a buffer (No. TC 5012 P made by TOSHIBA CORP.) is used as buffer circuit 250. Input terminal I1 is connected to input terminal 231 of main control circuit 60, and both disable terminals D4 and D2 are connected to the output terminal of NAND gate 246. Output terminal O1 is connected to BUS 0. Input terminals I2, I3, I4, I5, and I6 are all grounded.

Buffer circuit 251 is the same as buffer circuit 250. Input terminals I1, I2, I3, I4, I5, and I6 of buffer circuit 251 are connected to input terminals 232~237 of main control circuit 60, respectively. Both disable terminals D4 and D2 are connected to the output terminal of NAND gate 247. Output terminals O1~O6 are connected to bus lines BUS 11, BUS 10, BUS 9, BUS 8, BUS 7, and BUS 6, respectively.

Buffer circuit 252 is the same as buffer circuit 251. Input terminals I1 and I2 are connected to input terminals 238 and 239 of main control circuit 60, respectively, and input terminals I3, I4, I5, and I6 are grounded. Both disable terminals D4 and D2 are connected to the output terminal of NAND gate 247. Output terminals O1, O2, O3, O4, O5, and O6 are connected to bus lines BUS 5, BUS 4, BUS 3, BUS 2, BUS 1, and BUS 0, respectively.

As memory 253, an IC (No. CD 40174 made by RCA CORP.) is used. Clock input terminal CL is connected to the output terminal of AND gate 249, input terminals D1, D2, D3, D4, D5, and D6 are connected to bus lines BUS 11, BUS 10, BUS 9, BUS 8, BUS 7, and BUS 6, respectively, and reset terminal R is supplied by power source Vc (5 volts). Output terminals Q1~Q6 of memory 253 are connected to output terminals 261~266 of main control circuit 60, respectively.

Memory 254 is the same as memory 253. Clock input terminal CL is connected to the output terminal of AND gate 249, input terminals D1~D6 are connected to bus lines BUS 5, BUS 4, BUS 3, BUS 2, BUS 1, and BUS 0, respectively, and reset terminal R is supplied by power source Vc. Output terminals Q1 and Q2 of memory 254 are connected to output terminals 267 and 268 of main control circuit 60, respectively.

Figure 6:
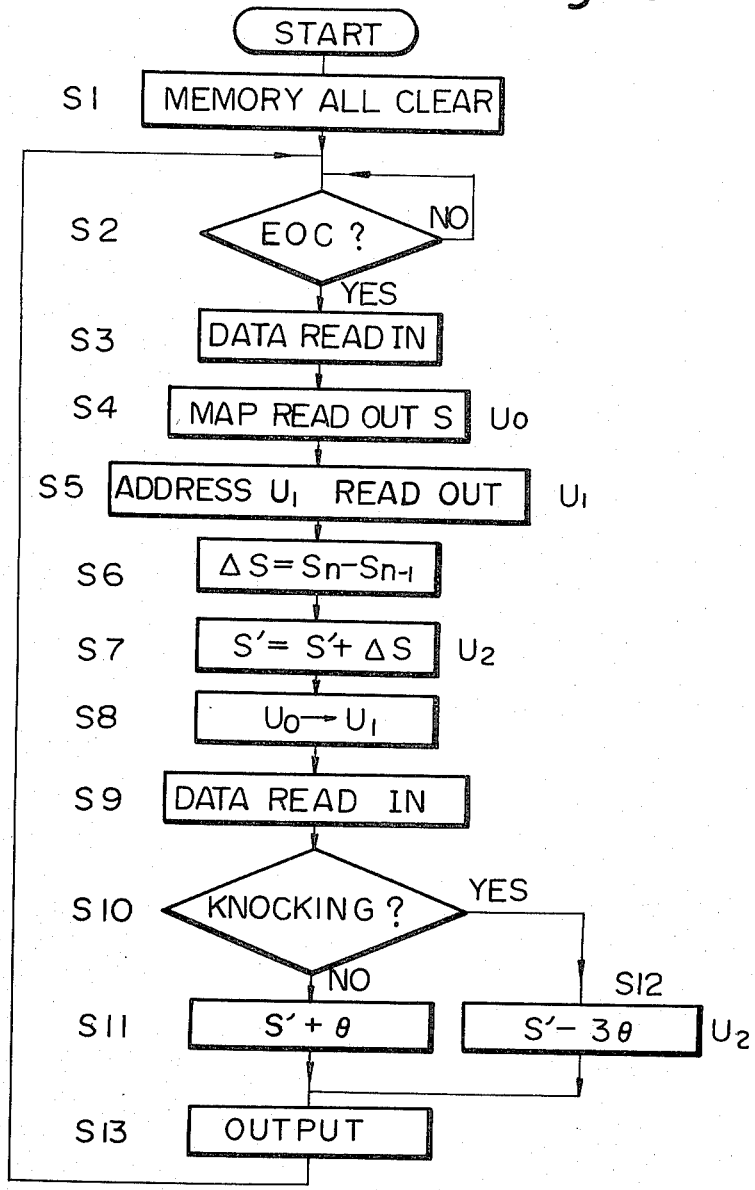
FIG. 6 is a flow chart illustrating the operation of the main control circuit of FIG. 5.

The operation of main control circuit 60 will be explained below with reference to the flow chart of FIG. 6. Power is supplied by switching on a key switch (not shown) and the circuit starts to operate. At step 1 (S1), the random-access memory (RAM) and registers in microcomputer 240 are clear.

By sampling a pulse from clock circuit 40, A-D converter 50 starts conversion, and when conversion is over, A-D converter 50 generates an EOC pulse. Then by the interrupting operation of microcomputer 240 due to the application of the EOC pulse through input terminal 230, the computing operation is started. At step 2 (S2), microcomputer 240 discriminates the existence of the interrupting signal EOC. If the EOC pulse is not supplied, microcomputer 240 stops to ready, and if the EOC pulse is supplied, microcomputer 240 progresses to step 3 (S3). At step 3, if the input/output command signal is logically "1" due to the DCU in microcomputer 240, device address selection signal SE1 is supplied to terminal 242. If both the input/output command signal and the device address selection signal are logically "1", the output of NAND gate 247 is logically "0", the inputs are connected to the outputs in buffers 251 and 252, respectively, and data output to the bus lines is loaded on registers of the processor in microcomputer 240. At step 4 (S4), the current value of the opening degree of control valve 15 corresponds to the opening degree of throttle valve 4, as shown in FIG. 2, and is previously programmed in the ROM, is read out, and is memorized in address U0 of RAM. This value is Sn. Initially, n is zero. At step 5 (S5), it is supposed that the value which is read out from address U1 of the RAM is Sn-1. Initially, Sn-1 is zero. At step 6 (S6), $\Delta S$ is calculated by the substraction of value Sn-1 stored in address U1 from value Sn stored in address U0. Value $\Delta S$ is the difference between the opening degree of the control valve when previously last sampled and the opening degree of the control valve when currently sampled, in respect to the current characteristics between the opening degree of the control valve and the opening degree of throttle valve 4.

At step 7 (S7), current value S', corresponding to the opening degree of the control valve, stored in address U2 is added to current value S computed at step 6, and the added value is stored in address U2. At step 8 (S8), value Sn in address U0 is stored in address U1. At step 9 (S9), the input/output command signal is logically "1" from the DCU, device address selection signal SE0 is logically "1", the output of NAND gate 246 is logically "0", the input is connected to the output in buffer circuit 250, and data supplied to input terminal 231 is loaded on a register of the processor. At step 10 (S10), the most significant digit in the date of 12 bits stored in said register is discriminated logically as "1" or "0". If the most significant digit is "1", the existence of knocking is discriminated because the output of knocking discrimination circuit 30 is "1" and the program progresses to step 12 (S12). If the most significant digit is "0", the non-existence of knocking is discriminated and the program progresses to step 11 (S11).

At step 11, value S' stored in address U2 is added to current increase $\theta$ corresponding to the increase in the opening degree of the control valve, and the added value is stored in address U2. At step 12, value S' stored in address U2 from which is substracted current decrease $3\theta$ corresponding to the decrease in the opening degree of the control valve, and the subtracted value is stored in address U2.

At step 13 (S13), the value stored in address U2 is supplied to the bus line. In this step, at first the input/output command signal from terminal 244 is logically "0" and almost simultaneously device address selection signal SE2 from terminal 243 is logically "1". Further, almost simultaneously the value stored in address U2 is supplied to the bus line. Due to the logical operation of inverter 248 and AND gate 249, when the input/output command signal and the device address selection signal are in the above-mentioned state, the output of AND gate 249 changes logically from "0" to "1". As a result, memory 253 memorizes data supplied on the bus line and supplies the memorized data to output terminals 261~268 of main control circuit 60, and then the operation of microcomputer 240 returns to step 2 in the flow chart of FIG. 6.

As mentioned above, in this control method, when there is no knocking signal, the opening degree of valve 15 increases so that it corresponds to the current value to which increment $\theta$ is added, and when there is a knocking signal, the opening degree of valve 15 decreases so that it corresponds to the current value from which decrement $3\theta$ is subtracted. Further, when the opening degree of the throttle valve changes, the electric current value corresponding to the change is superposed on the electric current value corresponding to the opening degree of valve 15 before the change.

Digital-analog (D-A) converter 70 converts binary code signals from main control circuit 60 to an analog voltage, and the analog voltage is supplied to output terminal 184 of knocking control circuit 18.

Input terminal 161 of drive circuit 16 is connected to the output terminal of knocking control circuit 18. Input terminal 161 is connected to noninverting input terminal of operational amplifier 164 through resistor 163. The output terminal of operational amplifier 164 is connected to the base of transistor 165. The emitter of transistor 165 is grounded through resistor 167, which is used to detect the electric current, and is connected to an inverting input terminal of operational amplifier 164 through resistor 166. A collector of transistor 165 is connected to one terminal of a coil of control valve 15 through output terminal 162 of drive circuit 16. Power source voltage $V_B$ is supplied to the other terminal of the coil. Drive circuit 16 supplies electric current, which is proportional to the voltage supplied at input terminal 161, to the coil of control valve 15.

Below, the operation of drive circuit 16 is explained. Voltage V1 supplied at input terminal 161 is compared with voltage V2 across electric current detection resistor 167, making use of operational amplifier 164. If voltage V2 across resistor 167 is low, the output voltage of operational amplifier 164 is increased, the base current of transistor 165 is increased, and the collector current is increased. The current stops increasing voltage V1 is equal to voltage V2. Capacitor 168 prevents oscillation of the circuit.

Figure 7:
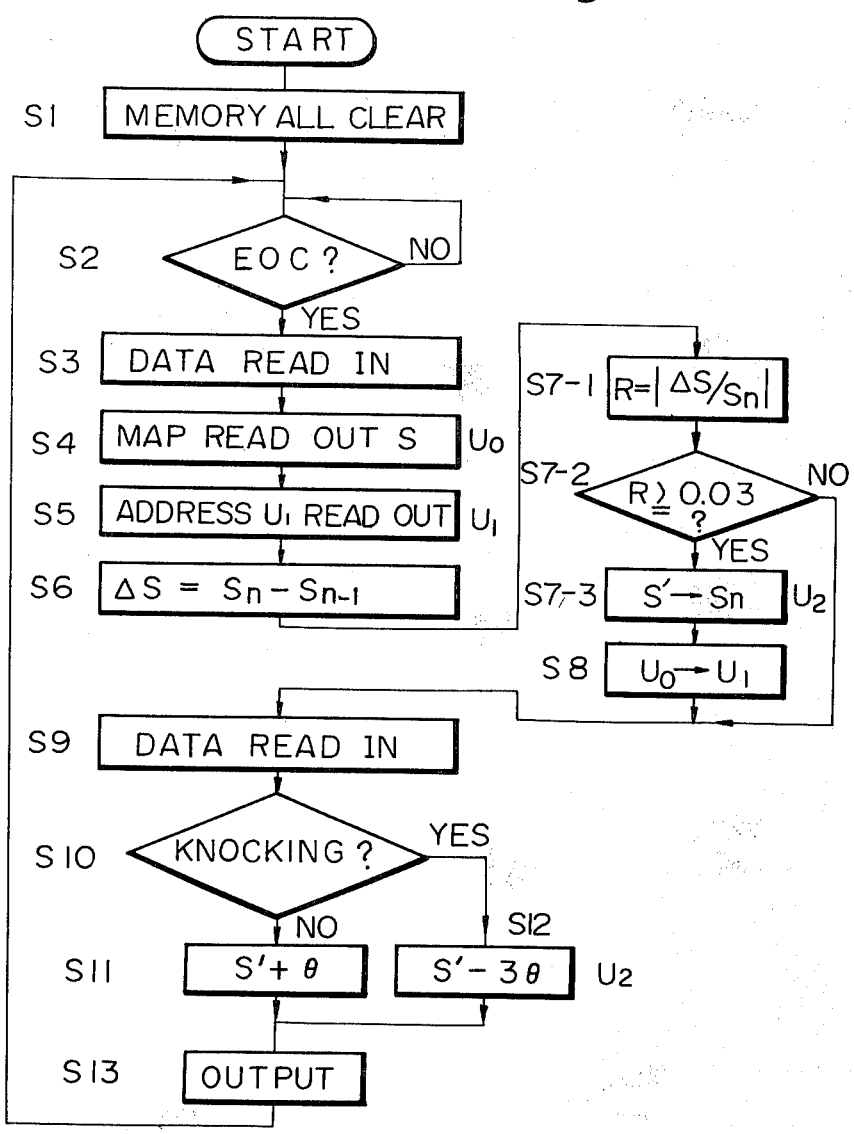
FIG. 7 is another flow chart illustrating the operation of the main control circuit in the other operating example of the present invention.

FIG. 7 shows another flow chart illustrating another example of the operation of the device according to the embodiment of the present invention. The difference between the above-mentioned example in FIGS. 1 through 6 and this example is only in the change of the program in microcomputer 240. The difference between the program of microcomputer 240 in the example in FIG. 6 and the program of microcomputer 240 in the example in FIG. 7 is as follows. Namely, in the example in FIG. 7, step 7 in the example in FIG. 6 is omitted and step 7-1 (S7-1), step 7-2 (S7-2), and step 7-3 S(7-3) are added between step 6 and step 8. At step 7-1, value $\Delta S$ calculated at step 6 is divided by value Sn stored in address U0 and absolute value R of the divided value is computed. At step 7-2, it is discriminated whether absolute value R is $\geq 0.03$. If YES, namely, if absolute value R is $\geq 0.03$, the program progresses to step 7-3 and if NO, namely, if absolute value R is not $\geq 0.03$, the program progresses to step 9. At step 7-3, value Sn stored in address U0 is stored in address U2. The steps after step 8 are the same as the steps shown in FIG. 6.

In the example in FIG. 7, the electric current corresponding to the opening degree of valve 15, which degree is controlled by the opening degree of throttle valve 4, is sampled every 10 milliseconds. When the change of the sampled electric current value becomes no less than plus or minus 3 percent compared with the last sampled value, instead of the electric current value regarding the opening degree of control value 15 controlling control value 15 hitherto, electric current value Sn regarding the opening degree of control valve 15, which value corresponds to the opening degree of throttle valve 4 is open and is read out from the map, controls the opening degree of valve 15. If the change of the sampled electric current value is less than plus or minus 3 percent, no change regarding the opening degree of throttle valve 4 is discriminated and control value S' controls the opening degree of control valve 15.

We claim:

1. A knocking control device for a turbocharged internal combustion engine, comprising:
intake pipe means for introducing air to an engine;
a throttle valve located in said intake pipe means;
turbocharger means including a compressor for supplying compressed air to the engine and an exhaust turbine for driving said compressor;
bypass pipe means provided so that the exhaust gas of the engine bypasses said exhaust turbine;
an exhaust bypass valve located in the middle of said bypass pipe means and controlling the exhaust gas bypassed through said bypass pipe means;
a diaphragm actuator for driving said exhaust bypass valve;

a pressure pipe for transmitting the pressure at the exit of said compressor to said diaphragm actuator;

a control valve for adjusting the pressure which is transmitted to said diaphragm actuator;

knocking sensor means for detecting knocking of the engine;

throttle sensor means for detecting the opening degree of said throttle valve; and control means for receiving the output signals of said knocking sensor means and said throttle sensor means, said control means controlling said control valve in accordance with a signal from said knocking sensor means so as to increase the opening degree of said exhaust bypass valve when knocking occurs and reduce the opening degree of said exhaust bypass valve when knocking does not occur, said control means determining upper and lower limits which are changed in accordance with a signal from said throttle sensor means and controlling the opening degree of said control valve using said determined upper and lower limits.

2. A knocking control device as defined in claim 1, wherein the output of said throttle sensor means include the superposition of the change of the signal determining the upper limit concerning the opening degree of said control valve on the signal determining the opening degree of said control valve due to the knocking signal when the opening degree of said throttle valve is changed.

3. A knocking control device as defined in claim 1, wherein said control means comprise:

a clock circuit for generating clock pulses;

an analog-digital converter for receiving the output of said throttle sensor means and the output of said clock circuit;

a knocking discrimination circuit for receiving the output of said knocking sensor means;

a main control circuit for receiving the output of said knocking discrimination circuit and the output of said analog-digital converter and for generating the control signal for said control valve; and a digital-analog converter for digital-analog converting the output of said main control circuit.

* * * * *